United States Patent [19]
Maresca et al.

[11] 4,321,355
[45] Mar. 23, 1982

[54] PROCESS FOR PREPARING POLYARYLATES

[75] Inventors: Louis M. Maresca, Belle Mead; Markus Matzner, Edison; Benito See, Belle Mead, all of N.J.

[73] Assignee: Union Carbide Corporation, New York, N.Y.

[21] Appl. No.: 189,561

[22] Filed: Sep. 23, 1980

[51] Int. Cl.³ .............................................. C08E 63/02
[52] U.S. Cl. .................... 528/180; 528/176; 528/194; 528/302; 528/500; 528/501
[58] Field of Search ............... 528/194, 176, 302, 500, 528/501, 180

[56] References Cited
U.S. PATENT DOCUMENTS

| | | | |
|---|---|---|---|
| 2,595,343 | 5/1952 | Drewitt et al. | 528/179 |
| 3,225,003 | 12/1965 | Macow | 528/179 |
| 3,317,464 | 5/1967 | Couix | 528/179 |
| 3,329,653 | 7/1967 | Beavers et al. | 528/179 |
| 3,684,766 | 8/1972 | Jackson et al. | 528/179 |
| 3,780,148 | 12/1973 | Jackson et al. | 528/179 |
| 3,824,213 | 7/1974 | Stackman | 528/179 |
| 3,948,856 | 4/1976 | Stackman | 528/179 |
| 4,075,173 | 2/1978 | Mioniyama et al. | 528/206 |

Primary Examiner—Morton Foelak
Attorney, Agent, or Firm—Donald M. Papuga

[57] ABSTRACT

Described herein is an improved process for preparing a polyarylate having a reduced viscosity of from about 0.5 to greater than 1.0 dl/gm which process comprises the following steps:

(a) reacting an acid anhydride derived from an acid containing from 2 to 8 carbon atoms with at least one dihydric phenol to form the corresponding diester; and (b) reacting said diester with at least one aromatic dicarboxylic acid at a temperature sufficient to form the polyarylate, wherein the improvement comprises removing residual acid anhydride, after formation of the dihydric phenol diester, so that its concentration is less than about 1500 parts per million. The novel polyarylates produced by the improved process of this invention are melt stable and low in color.

27 Claims, No Drawings

PROCESS FOR PREPARING POLYARYLATES

BACKGROUND OF THE INVENTION

This invention is directed to an improved process for preparing polyarylates which are melt stable and low in color.

Polyarylates are polyesters derived from a dihydric phenol, particularly 2,2-bis(4-hydroxyphenyl)propane also identified as Bisphenol-A, and an aromatic dicarboxylic acid, particularly mixtures of terephthalic and isophthalic acids. These polyacrylates are high temperature, high performance thermoplastic polymers with a good combination of thermal and mechanical properties. They also have good processability which allows them to be molded into a variety of articles.

Many processes have been described in the literature for the preparation of polyarylates. One such process is the diacetate process. In the diacetate process, a dihydric phenol is converted to its diester derivative, which is then reacted with an aromatic dicarboxylic acid(s), to form the polyarylate.

U.S. Pat. No. 4,075,173 issued Feb. 21, 1978, describes the preparation of copolyesters by reacting an aromatic dicarboxylic acid, a diacetate of Bisphenol-A, and an acetate of p-hydroxybenzoic acid. Various processes for producing polyarylates by the reaction of Bisphenol-A and terephthalic and isophthalic acids are reviewed in this patent. The following process for producing polyarylates, identified as route (1), is described in column 2, of the patent:

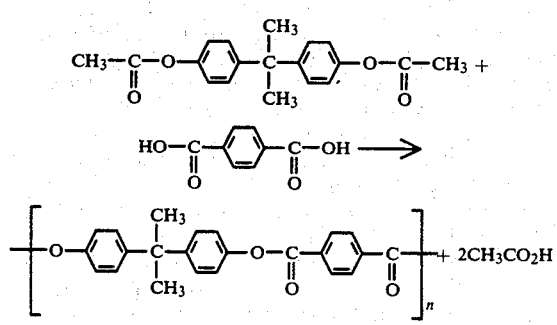

This process is the diacetate process as described herein, or the "Acetate Process" as defined in the patent.

Column 2 of the patent states:

"The route (1) is not desirable because the undesirable coloration and deterioration of polymer are particularly remarkable as disclosed in the above-mentioned literature."

Further, column 3 of the patent states:

"On the other hand, the route (1), Acetate process, is economically advantageous because the materials used are cheap and the operation is simple For example, diacetate of bisphenol-A, a monomer for Acetate process, is synthesized by merely reacting acetic anhydride and bisphenol-A. Consequently, it may be said that, if the fatal drawbacks of Acetate process, color and deterioration, are solved, Acetate process will become the most superior process."

Thus, the skilled workers in the field of polyarylate chemistry realize that the existing processes for producing polyarylates have one or more deficiencies, and that a need exists to develop a viable diacetate process for producing polyarylates.

The process of said U.S. Pat. No. 4,075,173 requires the use of p-hydroxybenzoic acid and produces a particular class of polyarylate copolymers.

In the following U.S. Patent Applications, novel methods for producing polyarylates by the diacetate process are described. Specifically these U.S. Patent applications describe the following:

U.S. Patent Application Ser. No. 069,818, filed Aug. 27, 1979 in the name of M. H. Berger, et al. and titled "Process For Preparing Polyarylates in the Presence of a Diphenyl Ether" describes a process for preparing polyarylates having a reduced viscosity of from about 0.5 to greater than 1.0 dl/gm, which process comprises reacting at least one diester derivative of a dihydric phenol with at least one aromatic dicarboxylic acid in the presence of from about 10 to about 60 weight percent, based on the polyarylate produced, of a diphenyl ether compound, at a temperature of from about 260° to about 350° C.

U.S. Patent Application Ser. No. 070,039, filed Aug. 27, 1979 in the name of L. M. Maresca, et al. and titled "Process For Preparing Polyarylates in the Presence of a Diphenyl Ether Compound and A Catalyst" describes a process for preparing polyarylates which process comprises reacting a diester derivative of a dihydric phenol with an aromatic dicarboxylic acid in the presence of from about 10 to about 60 weight percent of a diphenyl ether compound at a temperature of from about 260° to about 350° C. and in the presence of a magnesium catalyst.

U.S. Application Ser. No. 069,819, filed Aug. 27, 1979 in the name of M. H. Berger, et al. and titled "Process For Preparing Polyarylates" describes a process for preparing polyarylates of improved color which process comprises reacting a diester derivative of a dihydric phenol with an aromatic dicarboxylic acid in the presence of from about 10 to about 60 weight percent of at least one cycloaliphatic, substituted aromatic or heteroaromatic compound, which compounds contain at least one benzylic and/or tertiary hydrogen atom, at a temperature of from about 260° to about 350° C. Optionally, the process may be carried out in the presence of a magnesium, manganese, or zinc catalyst.

U.S. Patent Application Ser. No. 126,994, filed Mar. 3, 1980 in the name of M. H. Berger, et al. and titled "Process For Preparing Polyarylates" describes a process for preparing polyarylates which process comprises reacting a diester derivative of a dihydric phenol with an aromatic dicarboxylic acid in the presence of from about 10 to about 60 weight percent of at least one halogenated and/or etherated substituted aromatic or heteroaromatic compound, at a temperature of from about 260° to about 350° C.

However, in said U.S. Patent Applications Ser. Nos. 069,818; 070,039; 069,819 and 126,994, supra, the polyarylates produced by the diacetate process described therein still tend to contain colored species to an unacceptable extent and tend to be melt unstable if the intermediate dihydric phenol diester is not carefully purified prior to polymerization. Thus, the polyarylate must be prepared from a highly purified intermediate dihydric phenol diester, or it is difficult to fabricate. Also without purification of the diester, the polyarylate may not be acceptable in applications where polyarylates which are low in color are required.

It has now been unexpectedly found that removal of residual acid anhydride from the crude dihydric phenol diester reaction product prior to reaction with an aromatic dicarboxylic acid(s) to form the polyarylate polymer consistently produces a polyarylate which is melt stable and low in color. The residual acid anhydride is removed so that its concentration is less than about 1500 parts per million. Excess acid anhydride is necessary in the reaction with the dihydric phenol since it provides higher conversions in shorter time periods.

DESCRIPTION OF THE INVENTION

This invention is directed to an improved process for preparing polyarylate polymers by the diacetate process. The polyarylate polymers produced by the process of this invention are melt stable and low in color. It has been found that such a polyarylate is produced when the residual acid anhydride is removed after the formation of the dihydric phenol diester and prior to its reaction with the aromatic dicarboxylic acid(s). The residual acid anhydride is removed so that its concentration is less than about 1500 parts per million.

Additionally, it has been found that by removing the residual acid anhydride from the dihydric phenol diester reaction product, the diester can be reacted directly with the aromatic dicarboxylic acid(s), without a further purification step, to produce polyarylates which are melt stable and low in color.

The improved process for preparing a polyarylate having a reduced viscosity of from about 0.5 to greater than 1.0 dl/gm comprises the following steps:

(a) reacting an acid anhydride derived from an acid containing from 2 to 8 carbon atoms with at least one dihydric phenol to form the corresponding diester; and (b) reacting said diester with at least one aromatic dicarboxylic acid at a temperature sufficient to form the polyarylate, wherein the improvement comprises removing residual acid anhydride after formation of the dihydric phenol diester so that its concentration is less than about 1500 parts per million.

The acid anhydride suitable for use herein is derived from an acid containing from 2 to 8 carbon atoms. The preferred acid anhydride is acetic anhydride.

Any dihydric phenol well known to those skilled in the art may be used herein. Preferably, the dihydric phenol suitable for the use in this invention is of the following formula:

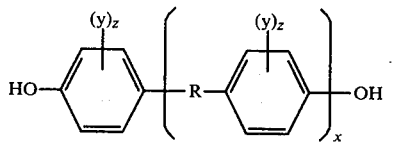

wherein y is independently selected from alkyl groups of 1 to 4 carbon atoms, chlorine or bromine, z independently has a value of from 0 to 4, inclusive, and R is independently selected from a divalent saturated aliphatic hydrocarbon radical, particularly alkylene or alkylidene radicals having from 1 to 8 carbon atoms, especially $C(CH_3)_2$, cycloalkylene or cycloalkylidene radicals having up to and including 9 carbon atoms, O, S, SO, $SO_2$, and CO, x is 0 or 1.

The dihydric phenols that may be used in this invention include the following:

2,2-bis-(4-hydroxyphenyl)propane,
bis-(2-hydroxyphenyl)methane,
bis-(4-hydroxyphenyl)methane,
bis-(4-hydroxy-2,6-dimethyl-3-methoxyphenyl)methane,
1,1-bis-(4-hydroxyphenyl)ethane,
1,2-bis-(4-hydroxyphenyl)ethane,
1,1-bis-(4-hydroxy-2-chlorophenyl)ethane,
1,1-bis-(3-methyl-4-hydroxyphenyl)ethane,
1,3-bis-(3-methyl-4-hydroxyphenyl)propane,
2,2-bis-(3-phenyl-4-hydroxyphenyl)propane,
2,2-bis-(3-isopropyl-4-hydroxyphenyl)propane,
2,2-bis-(2-isopropyl-4-hydroxyphenyl)propane,
2,2-bis-(4-hydroxyphenyl)pentane,
3,3-bis-(4-hydroxyphenyl)pentane,
2,2-bis-(4-hydroxyphenyl)heptane,
1,2-bis-(4-hydroxyphenyl)1,2-bis-(phenyl)-propane,
4,4'-(dihydroxyphenyl)ether,
4,4'-(dihydroxyphenyl)sulfide,
4,4'-(dihydroxyphenyl)sulfone,
4,4'-(dihydroxyphenyl)sulfoxide,
4,4'-(dihydroxybenzophenone),
hydroquinone, and
naphthalene diols.

Generally, the dihydric phenol reacts with the acid anhydride under conventional esterification conditions to form the dihydric phenol diester. The reaction may take place in the presence or absence of a solvent. Additionally, the reaction may be conducted in the presence of a conventional esterification catalyst or in the absence thereof.

The aromatic dicarboxylic acid(s) that may be used in this invention include terephthalic acid, isophthalic acid, any of the naphthalene dicarboxylic acids and mixtures thereof, as well as alkyl substituted homologs of these carboxylic acids, wherein the alkyl group contains from 1 to about 4 carbon atoms, and acids containing other inert substituents such as halides, alkyl or aryl ethers, and the like. Preferably, mixtures of isophthalic and terephthalic acids are used. The isophthalic acid to terephthalic acid ratio in the mixture is about 20:80 to about 100:0, while the most preferred acid ratio is about 25:75 to about 75:25. Also, from about 0.5 to about 20 percent of at least one aliphatic diacid containing from 2 to about 10 carbon atoms, such as adipic acid, sebacic acid, and the like, or mixtures thereof, may be additionally used in the polymerization reaction.

The preparation of the polyarylate may be carried out in bulk preferably in the presence of from about 10 to about 60, more preferably from about 25 to about 60, and most preferably, from about 30 to about 60 weight percent, based on the weight of the polyarylate produced, of an organic solvent.

The preferred organic solvents are a diphenyl ether compound as described in U.S. Patent Application Ser. No. 069,818, supra, a cycloaliphatic substituted aromatic or heteroaromatic compound, as described in U.S. Patent Application Ser. No. 069,819, supra, and a halogenated and/or etherated substituted aromatic or heteroaromatic compound, as described in U.S. Patent Application Ser. No. 126,994, supra, or mixtures of these.

The diphenyl ether compound, as described in U.S. Patent Application Ser. No. 069,818, supra, may be substituted. These substituents are selected from alkyl groups, chlorine, bromine or any substituent which does not interfere with the polyarylate forming reaction or the reaction forming the diester derivative of the dihydric phenol. Additionally, the diphenyl ether compound may be used with up to 50 weight percent of other compounds, such as various biphenyls or any other compounds which do not interfere with the polyarylate forming reaction or the reaction forming the diester derivative of the dihydric phenol.

The cycloaliphatic compounds, or substituted aromatic or heteroaromatic compounds, as described in U.S. Patent Application Ser. No. 069,819, supra, contain at least one benzylic and/or tertiary hydrogen atoms. These compounds have a boiling point of about 150° to about 350° C., preferably from about 180° to about 280° C., and most preferably from about 180° to about 220° C., at atmospheric pressure. Additionally, these compounds have a solubility parameter, at a temperature of 250° C., of ±4 within the solubility parameter of the polyarylate being produced. Solubility parameter is a measure for correlating polymer solvent interaction. It is defined in "Properties of Polymers", D. W. Van Krevelen, Elsevier Scientific Publishing Co., Amsterdam-Oxford-New York, 1976, pp. 141-155, as the square root of the cohesive energy density.

The cycloaliphatic compounds are of the following formulae:

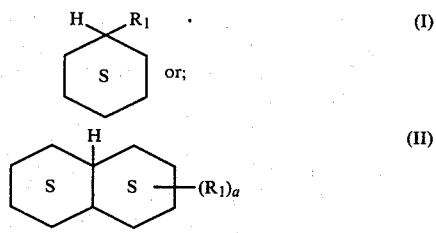

wherein $R_1$ is independently alkyl of 1 to 6 carbon atoms, cycloalkyl of 6 to 18 carbon atoms, and a is an integer of 1 or 2.

The substituted aromatic compounds are of the following formula:

wherein $R_2$ is independently alkyl of 1 to 6 carbon atoms, cycloalkyl of 6 to 18 carbon atoms and aralkyl or alkaryl of 7 to 18 carbon atoms and wherein the carbon atom of $R_2$ attached directly to the benzene nucleus has 1 or 2 attached hydrogen atoms, and b is an integer of 1 to 6.

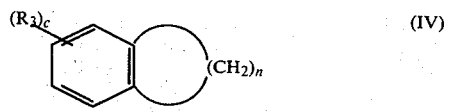

wherein $R_3$ is independently alkyl of 1 to 6 carbon atoms, cycloalkyl of 6 to 18 carbon atoms, c is an integer of 1 or 2, and n is an integer of 1 to 6.

The heteroaromatic compounds are of the following formula:

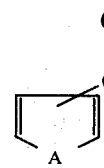

wherein A is S, O, or —CH═N—, $R_4$ is independently alkyl of 1 to 6 carbon atoms, or cycloalkyl of 6 to 18 carbon atoms and wherein the carbon atom of $R_4$ attached directly to the heteroaromatic nucleus has 1 or 2 attached hydrogen atoms, and d is an integer of 1 to 4.

The preferred compounds encompassed by structures (I) through (V) include xylenes, cumene, diethylbenzene, diisopropyl benzene, tetrahydronaphthalene or decahydronaphthalene.

Additionally, the cycloaliphatic, substituted aromatic or heteroaromatic compounds may be used with up to 90 weight percent of other compounds such as diphenyl ether, dimethylsulfone, etc.

The halogenated and/or etherated substituted aromatic or heteroaromatic compounds, as described in U.S. Patent Application Ser. No. 126,994, supra, are of the formulae:

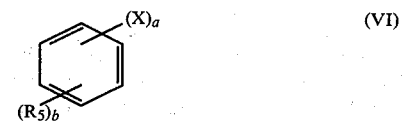

wherein X is independently Cl, Br, F, or $OR_6$, a is an integer of 1 to 5, $R_5$ is independently alkyl of 1 to 16 carbon atoms, cycloalkyl of 6 to 18 carbon atoms, aryl of 6 to 18 carbon atoms, or aralkyl or alkaryl of 7 to 18 carbon atoms, $R_6$ is independently alkyl of 1 to 16 carbon atoms or cycloalkyl of 6 to 18 carbon atoms, and b is integer of 0, 1, or 2;

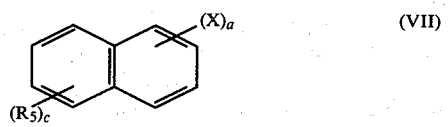

wherein X, $R_1$ and a are as previously defined, and c is an integer of 0 to (8-a).

The heteroaromatic compounds are of the following formula:

wherein A is O, S, or —CH═N—, X and $R_5$ are as previously defined, d is an integer of 1 to 4 and f is integer of 0 to (4-d).

The compounds encompassed by structures (VI) through (VIII) include 1,2,3-trichlorobenzene; 1,2,4-trichlorobenzene, 1,2- or 1,3- or 1,4-dichlorobenzene; 1,2,3- or 1,2,4- or 1,3,5-trimethoxybenzene; 1,2- or 1,3- or 1,4-dibromobenzene; chlorobenzene; bromobenzene; 1-chloronaphthalene; 2-chloronaphthalene; 1-bromonaphthalene; 2-bromonaphthalene; 1,2- or 1,3- or 1,4-dimethoxybenzene; 2-bromotoluene; 2-chlorotoluene; 4-bromotoluene; 4-chlorotoluene; anisole; 2-methylanisole; 3-methylanisole; 4-methylanisole; 2- chloroanisole; 3-chloroanisole; 4-chloroanisole; 2-bromoanisole; 3-bromoanisole and 4-bromoanisole.

Additionally, the halogenated and/or etherated substituted aromatic or heteroaromatic compounds may be used with up to 90 weight percent of other compounds such as diphenyl ether, dimethylsulfone, etc.

The amount of said solvents could vary during the polymerization reaction. For example, it may be advantageous to increase progressively the amount of these solvents to maintain the reaction medium at constant viscosity.

A catalyst may be used to accelerate the rate of polyarylate formation. All the conventional catalysts capable of accelerating an ester exchange reaction are suitable for use herein. These include metal salts, generally the Group VII and VIII metal salts, such as magnesium, manganese or zinc salts. The salts are generally organic acid salts and include acetates, propionates, benzoates, oxalates, acetylacetonates, or mixtures thereof. A preferred catalyst is magnesium acetate. The catalyst is present in the reaction in a catalytically effective amount which can be, for example, from about 1 to about 1000, preferably from about 10 to about 50, parts per million, based on the weight of the polyarylate produced.

The polyarylate polymer may be prepared in two reaction vessels by adding the acid anhydride and dihydric phenol to a reaction vessel and reacting these under esterification conditions described, supra to form the diester derivative of the dihydric phenol. Residual acid anhydride is then removed by methods known in the art, such as by vacuum distillation, or by chemical reaction with reactants which are not harmful to the polymerization, such as water, alcohols, dihydroxy compounds, and the like. The diester derivative may then be added to a second reaction zone, without any purification. The second reaction zone contains aromatic dicarboxylic acid(s), and optionally solvent and/or catalyst. The polymerization is then carried out. Alternatively, the diester derivative is added to the second reaction zone and aromatic dicarboxylic acid(s), and optionally, solvent and/or catalyst added thereto and the polymerization carried out. Any combination of adding the diester derivative, aromatic dicarboxylic acid(s), and optionally solvent and/or catalyst to a reaction vessel may be used.

In another embodiment of this invention, the diester derivative of the dihydric phenol is prepared in a reaction zone by reacting the acid anhydride and dihydric phenol therein under the esterification conditions described, supra. Residual acid anhydride is then removed by the procedures described, supra. Aromatic dicarboxylic acid(s) and optionally solvent and/or catalyst is then added to the reaction zone and the polymerization reaction carried out to produce the polyarylate.

The residual acid anhydride is removed so that its concentration is less than about 1500, preferably less than about 800, and most preferably less than about 500 parts per million.

The dihydric phenol diester is prepared by reacting a dihydric phenol with an acid anhydride at a temperature of from about 130° to about 160° C. for a period of from about 0.5 to about 4 hours and at a pressure of from about 1 to about 3 atmospheres. Generally, the reaction is carried out using an excess of acid anhydride. The acid anhydride is used at about 25 percent excess. The process is preferably carried out at a pressure sufficient to have the solvent refluxing at the reaction temperature. Under these conditions conversion to the dihydric phenol diester is at least 99.9 percent.

The polymerization process of this invention is carried out at a temperature of from about 260° to about 350° C. and preferably, from about 275° to about 295° C. The polymerization process is generally conducted in an inert atmosphere (such as argon or nitrogen) so that the oxygen content therein is minimized or eliminated. The oxygen content is generally less than about 100, preferably less than about 30, and most preferably less than about 10 parts per million. The process is preferably carried out at a pressure sufficient to have the solvent refluxing at the reaction temperature. This pressure is generally from about atmospheric to about 11 atmospheres. Lower and higher pressures may also be used.

The polymerization reaction is conducted for a period of time sufficient to produce a polyarylate having a reduced viscosity of at least about 0.5 to greater than 1.0 dl/gm, which time is generally less than about 10 hours. The reaction time is generally in the range of from about 4 hours to about 8 hours, depending on the particular polyarylate being prepared.

The polymerization reaction of this invention may be carried out batchwise or continuously and by using any apparatus desired.

The process of this invention produces novel polyarylates having a reduced viscosity of from about 0.5 to greater than about 1.0, preferably from about 0.6 to about 0.8 dl/gm, as measured in chloroform (0.5 g/dl chloroform) or other suitable solvent at 25° C. In those instances where the polyarylate is not soluble in chloroform, other solvents known in the art, such as parachlorophenol, phenol/tetrachloroethane (60:40), and the like, may be used. Reduced viscosities of the polyarylates measured in these solvents generally have the same range as those measured in chloroform.

The polyarylates may be prepared in the presence of materials such as molecular weight regulators, antioxidants, and the like.

The polyarylates obtained by the process of this invention may be used together with the well-known additives such as plasticizers, pigments, lubricating agents, mold release agents, stabilizers, inorganic fillers, and the like. These polyarylates may also be blended with one or more thermoplastic polymers such as polyesters, polycarbonates, styrene polymers, alkyl acrylate polymers, polyurethanes, poly(aryl ether) polymers, polyamides, polyhydroxy ether polymers, copolyetherester block copolymers, polyamides, and the like.

EXAMPLES

The following examples serve to give specific illustrations of the practice of this invention but they are not intended in any way to limit the scope of this invention.

CONTROL A

The reactor system consisted of a hot oil heated reactor fitted with a nitrogen inlet, mechanical agitator, and overhead column connected to an overhead take-off device consisting of a condenser and a receiver.

The reactor was charged with 75.0 pounds of recrystallized bisphenol diacetate, 19.8 pounds of isophthalic acid, 19.8 pounds of terephthalic acid and 57.5 pounds of diphenyl ether (40 weight percent based on the polymer produced). The reactor system was purged with nitrogen for about 20 minutes and then the heater turned on to raise the temperatures of the reactor to about 270° C. (the oil heater was set at about 300° C.). Acetic acid started to distill when the temperature of the mixture reached about 255° C. Acetic acid distillation was followed by measuring its level in the receiver. After about 3.5 hours at 270° C., the power draw on the agitator began to increase which indicated a viscosity increase. The reaction was terminated after 7.5 hours at reflux. The polymer was isolated by feeding the reaction product to a twin screw four vent extruder and flashing off the solvent. The barrel temperature of the extruder was 325° C., the first vent was under a pressure of about 500 mm Hg, and the second vent was under a pressure of about 200 mm Hg, and the final vents were at about 10 mm Hg absolute. The residence time of the polymer in the extruder was 2 to 5 minutes. The polymer had a reduced viscosity of 0.70 dl/g as measured in chloroform (0.50 gm/100 ml) at 25° C.

The melt stability of the polymer was measured in a Tinius Olsen thermodyne (melt flow cell) at 375° C. The polymer was added to the preheated (375° C.) chamber of the thermodyne and put under a constant pressure of 44 psi. After 10 and 30 minutes at 375° C., samples of the polymer were taken by allowing the polymer to flow freely from the bottom of the cavity. The reduced viscosity of these samples was measured in chloroform (0.50 gm/100 ml) at 25° C. and found to be 0.67 and 0.63 dl/g, respectively.

The data is summarized in the Table.

This Control shows that when pure (crystallized) bisphenol diacetate is used to prepare the polyarylate, a stable polymer is obtained.

EXAMPLE 1

A. Preparation of Bisphenol-A Diacetate

Into a glass lined reactor was charged 880 grams of bisphenol-A and 1000 grams of acetic anhydride. The reaction was heated to about 135° C. and held at this temperature for about 4 hours. Vacuum was then slowly applied to distill acetic acid and excess acetic anhydride. At maximum vacuum, the material temperature was allowed to rise to 150° C. and held until no further distillation was evident (approximately 30 minutes). Analysis of the crude product showed that conversion to bisphenol-A diacetate was 99.9% complete. The material also contained some residual acetic anhydride (less than 600 ppm based on weight of bisphenol-A diacetate as measured by titration with morpholine as described in Siggia and Hana, "Quantitative Organic Analysis via Functional Groups", Fourth Edition, Wiley-Interscience, 1979, pages 231 to 235).

B. Polymerization

The crude bisphenol-A diacetate prepared in (A) was charged into a second reactor. Also, 319 grams of isophthalic acid, 319 grams of terephthalic acid and 918 grams of diphenyl ether were charged to the reactor. The reaction was conducted under the conditions as described in Control A.

The polyarylate polymer produced had a reduced viscosity of 0.79 dl/g as measured in chloroform (0.50 gm/100 ml) at 25° C.

The melt stability of the polymer was measured in a Tinius Olsen thermodyne by the procedure as described in Control A. The reduced viscosity of the samples after 10 and 30 minutes in the thermodyne was 0.75 and 0.71 dl/g, respectively (as measured in chloroform, 0.50 gm/100 ml at 25° C.).

The data is summarized in the Table.

CONTROL B

The procedure of Example 1 was repeated without removing the excess acetic anhydride as was done in Example 1. The crude bisphenol-A diacetate contained 3000 ppm of residual acetic anhydride (as determined by the procedure described in Example 1).

The polymer produced had a reduced viscosity of 0.72 dl/g as measured in chloroform (0.50 gm/100 ml at 25° C.).

The melt stability of the polymer was measured in a Tinius Olsen thermodyne by the procedure as described in Example 1. The reduced viscosity of the samples after 10 and 30 minutes in the thermodyne was 0.66 and 0.58 dl/g, respectively (as measured in chloroform, 0.50 gm/100 ml at 25° C.).

The data is summarizd in the Table.

In the following Example 2, excess acetic anhydride was removed by a chemical reaction with an equivalent amount of bisphenol-A.

EXAMPLE 2

Using the procedure described in Example 1, 75.4 pounds of bisphenol-A diacetate was prepared which contained 2600 ppm of residual acetic anhydride (as determined by the procedure described in Example 1. All of the bisphenol-A diacetate was charged into a reactor with 19.91 pounds of isophthalic acid, 19.9 pounds of terephthalic acid, 0.18 pounds of bisphenol-A and 59.5 pounds of diphenyl ether. The polymerization was carried out as described in Example 1.

The polymer produced had a reduced viscosity of 0.68 dl/g as measured in chloroform (0.50 gm/100 ml) at 25° C.

The melt stability of the polymer was measured in a Tinius Olsen thermodyne by the procedure as described in Example 1. The reduced viscosity of the samples after 10 and 30 minutes in the thermodyne was 0.66 and 0.61 dl/g, respectively (as measured in chloroform, 0.50 gm/100 ml at 25° C.).

The data is summarized in the Table.

TABLE[1]

| Example | $RV_0$ | $RV_{10}$ | $RV_{30}$ | $\frac{RV_{10}}{RV_0}$ | $\frac{RV_{30}}{RV_0}$ |
|---|---|---|---|---|---|
| Control A | 0.70 | 0.67 | 0.63 | 0.96 | 0.90 |
| 1 | 0.79 | 0.75 | 0.71 | 0.95 | 0.90 |
| Control B | 0.72 | 0.66 | 0.58 | 0.92 | 0.81 |
| 2 | 0.68 | 0.66 | 0.61 | 0.97 | 0.90 |

[1] $RV_0$ = the reduced viscosity of the polyarylate as prepared.
$RV_{10}$, $RV_{30}$ = the reduced viscosity of the polyarylate after 10 and 30 minutes in the thermodyne.

The data in the Table shows that without reducing the acetic anhydride concentration in bisphenol-A diacetate prior to the polymerization (Control B), the product obtained is less stable. Consequently, these materials exhibit larger drops in reduced viscosity after 10 and 30 minutes at 375° C.

If acetic anhydride is removed either physically (Example 1) or by chemical reaction (Example 2), then a polyarylate having improved thermal stability is produced.

What is claimed is:

1. An improved process for preparing a polyarylate having a reduced viscosity of from about 0.5 to greater than 1.0 dl/g which process comprises the following steps:

(a) reacting an acid anhydride derived from an acid containing from 2 to 8 carbon atoms with at least one dihydric phenol to form the corresponding diester; and (b) reacting said diester with at least one aromatic dicarboxylic acid at a temperature sufficient to form the polyarylate, wherein the improvement comprises removing residual acid anhydride, after formation of the dihydric phenol diester, so that its concentration is less than about 1500 parts per million.

2. A process as defined in claim 1, wherein the acid anhydride is acetic anhydride.

3. A process as defined in claim 1, wherein the dihydric phenol is of the following formula

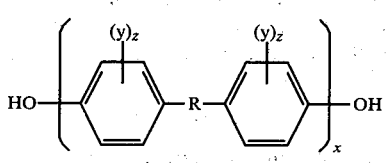

wherein y is independently selected from alkyl groups of 1 to 4 carbon atoms, chlorine or bromine, z independently has a value of from 0 to 4, inclusive, R is independently selected from a divalent saturated hydrocarbon radical having 1 to 8 carbon atoms, a cycloalkylene or cycloalkylidene radical having up to and including 9 carbon atoms, O, S, SO, $SO_2$, CO, x is 0 or 1.

4. A process as defined in claims 1, 2, or 3 wherein the dihydric phenol is bisphenol-A.

5. A process as defined in claim 1, wherein the aromatic dicarboxylic acid is selected from isophthalic acid, terephthalic acid, or mixtures thereof.

6. A process as defined in claim 5 wherein the isophthalic acid to terephthalic acid ratio in the mixture of acids is about 20:80 to about 100:0.

7. A process as defined in claim 6, wherein the ratio is about 25:75 to about 75:25.

8. A process as defined in claim 1, wherein an aliphatic diacid containing from 2 to about 10 carbon atoms is added in step (b).

9. A process as defined in claim 8, wherein the diacid is selected from adipic acid or sebacic acid, or mixtures thereof.

10. A process as defined in claims 8 or 9, wherein from about 0.5 to about 20 percent of the diacid is added.

11. A process as defined in claim 1, wherein the diester is reacted with at least one aromatic dicarboxylic acid in the presence of an organic solvent.

12. A process as defined in claim 11, wherein the solvent is selected from a diphenyl ether compound, a cycloaliphatic compound or a substituted aromatic or heteroaromatic compound, or a halogenated and/or etherated substituted aromatic or heteroaromatic compound, or mixtures thereof.

13. A process as defined in claim 11, wherein the solvent is diphenyl ether.

14. A process as defined in claims 11 or 12, or 13, wherein the solvent is present in an amount of from about 10 to about 60 weight percent, based on the weight of the polyarylate polymer produced.

15. A process as defined in claim 11, wherein the solvent is present in an amount of from about 25 to about 60 weight percent, based on the weight of the polyarylate polymer produced.

16. A process as defined in claim 1, wherein the reaction in step (b) is carried out in the presence of a catalytically effective amount of a catalyst.

17. A process as defined in claim 16, wherein the catalyst is selected from the Group VII or Group VIII metal salts.

18. A process as defined in claim 17, wherein the salts are magnesium, manganese, or zinc salts.

19. A process as defined in claims 1 or 16, wherein the catalyst is magnesium acetate.

20. A process as defined in claim 1 wherein the temperature is from about 260° to about 350° C.

21. A process as defined in claims 1 or 20, wherein the temperature is from about 275° to about 295° C.

22. A process as defined in claim 1, wherein the residual acid anhydride concentration is less than about 800 parts per million.

23. A process as defined in claim 1 wherein the residual acid anhydride concentration is less than about 500 parts per million.

24. A process as defined in claim 1, wherein the reaction in step (b) is carried out in the absence of oxygen.

25. A process as defined in claim 1, wherein the oxygen content in step (b) is less than about 100 parts per million.

26. A polyarylate polymer having a reduced viscosity of from about 0.5 to greater than 1.0 dl/g produced by the process of claim 1.

27. A polyarylate polymer as defined in claim 26 which has a reduced viscosity of from about 0.6 to about 0.8 dl/g as measured in chloroform.

* * * * *